(12) United States Patent
Zhang et al.

(10) Patent No.: US 8,081,239 B2
(45) Date of Patent: Dec. 20, 2011

(54) IMAGE PROCESSING APPARATUS AND IMAGE PROCESSING METHOD

(75) Inventors: Jing Zhang, Tokyo (JP); Seijiro Inaba, Kanagawa (JP); Takuya Chiba, Tokyo (JP)

(73) Assignee: Sony Corporation (JP)

( * ) Notice: Subject to any disclaimer, the term of this patent is extended or adjusted under 35 U.S.C. 154(b) by 662 days.

(21) Appl. No.: 12/290,229

(22) Filed: Oct. 28, 2008

(65) Prior Publication Data

US 2009/0141149 A1 Jun. 4, 2009

(30) Foreign Application Priority Data

Oct. 29, 2007 (JP) .................. P2007-279810

(51) Int. Cl.
*H04N 5/217* (2006.01)
*H04N 5/202* (2006.01)
(52) U.S. Cl. ........................ 348/241; 348/254
(58) Field of Classification Search ............... 348/222.1, 348/241, 254–256; 358/519–521
See application file for complete search history.

(56) References Cited

U.S. PATENT DOCUMENTS

| 6,724,943 | B2 | 4/2004 | Tsuchiya et al. | |
| 7,733,390 | B2* | 6/2010 | Kuniba | 348/241 |
| 2008/0079825 | A1* | 4/2008 | Matsuda | 348/241 |

FOREIGN PATENT DOCUMENTS

| JP | 01277061 A | 11/1989 |
| JP | 2001-298621 A | 10/2001 |
| JP | 2005-311455 A | 11/2005 |
| JP | 2006-041946 A | 2/2006 |
| JP | 2006-060744 A | 3/2006 |
| JP | 2008017458 A | 1/2008 |
| WO | 2005055588 A1 | 6/2005 |

OTHER PUBLICATIONS

Office Action from Japanese Application No. 2007-279810, dated Jun. 21, 2011.

* cited by examiner

*Primary Examiner* — Mohammed Hasan
(74) *Attorney, Agent, or Firm* — Lerner, David, Littenberg, Krumholz & Mentlik, LLP

(57) ABSTRACT

An image processing apparatus includes a gradation correction unit configured to multiply input image data by a gradation correction value appropriate for the input image data so as to obtain gradation corrected image data; and a noise suppression unit configured to suppress noise of the gradation corrected image data on the basis of a noise model of the input image data to obtain output image data. The noise suppression unit includes a parameter generator configured to generate a noise suppression parameter in accordance with the gradation corrected image data by using the noise model; a parameter correction unit configured to multiply the noise suppression parameter by the gradation correction value to correct the noise suppression parameter; and a low-pass filter configured to vary characteristics thereof in accordance with the noise suppression parameter corrected by the parameter correction unit and to suppress noise of the gradation corrected image data.

6 Claims, 16 Drawing Sheets

FIG. 11

| 1 | 4 | 1 |
|---|---|---|
| 4 | 16 | 4 |
| 1 | 4 | 1 |

FIG. 12

| 1 | 2 | 1 |
|---|---|---|
| 2 | 4 | 2 |
| 1 | 2 | 1 |

IMAGE PROCESSING APPARATUS AND IMAGE PROCESSING METHOD

CROSS REFERENCES TO RELATED APPLICATIONS

The present application claims priority from Japanese Patent Application No. JP 2007-279810, filed in the Japanese Patent Office on Oct. 29, 2007, the entire content of which is incorporated herein by reference.

BACKGROUND OF THE INVENTION

1. Field of the Invention

The present invention relates to an image processing apparatus and an image processing method, and can be applied to, for example, electronic still cameras.

2. Description of the Related Art

Hitherto, in image processing apparatuses, such as electronic still cameras, image quality has been improved by various types of image processing. Here, examples of such image processing include a noise reduction process (hereinafter will be referred to as an "NR process") for reducing a noise level, a skin-tone process (hereinafter will be referred to as an "SK process") for smoothing a skin-tone portion by using a low-pass filter and improving the appearance of a face of a person, and the like, and a wide-dynamic-range correction process (hereinafter will be referred to as a "WDR process") for expanding the apparent dynamic range by dynamically varying the gradation in accordance with the luminance distribution of an image.

FIG. 19 is a block diagram showing an electronic still camera of the related art. In an electronic still camera 1, a solid-state image-capturing element 2 is a two-dimensional image sensor formed of, for example, a charge-coupled device (CCD) sensor, a complementary metal-oxide semiconductor (CMOS) sensor, or the like, and performs a photoelectric conversion process on an optical image formed on the image-capturing plane by lenses (not shown) and outputs an image-captured signal S1.

An analog-to-digital (A/D) conversion circuit 3 performs an analog-to-digital conversion process on the image-captured signal S1 and outputs image-captured data D2.

After an optical correction unit 4 corrects image distortion of the image-captured data D2, which is caused by optical characteristics of the lenses, the optical correction unit 4 converts the image-captured data D2 into image data D3 formed of color data of red, green, and blue, and outputs it.

A white-balance unit 5 adjusts the white balance of the image data D3 output from the optical correction unit 4 and outputs it. A wide-dynamic-range correction unit 6 performs a WDR process on image data D4 output from the white-balance unit 5 and outputs it. A skin-tone processor 7 performs an SK process on image data D5 output from the wide-dynamic-range correction unit 6 and outputs it. A noise suppression unit 8 performs an NR process on image data D6 output from the skin-tone processor 7 and outputs it. A gamma processor 9 performs a gamma correction process on image data D7 output from the noise suppression unit 8 and outputs it.

A recorder 10 performs a computation process on image data D8 output from the gamma processor 9, and converts the image data D8 into image data formed of a luminance signal and color-difference signals. Here, when the luminance signal and the color-difference signals are denoted as Y, and Cr and Cb, respectively, and when color data of red, green, and blue is denoted as R, G, and B, respectively, the computation process is represented by, for example, $Y=0.3 R+0.6 G+0.1 B$, $Cr=R-Y$, and $Cb=B-Y$. The recorder 10 records the image data of the luminance signal and the color-difference signals on a recording medium 11. Examples of the recording medium 11 include an optical disc, a magnetic disc, a memory card, and the like.

FIG. 20 is a block diagram showing in detail the wide-dynamic-range correction unit 6, the skin-tone processor 7, and the noise suppression unit 8. In the wide-dynamic-range correction unit 6, a correction value generator 15 generates a gradation correction curve used to correct the gradation of the image data D4 on the basis of the image data D4 output from the white-balance unit 5. More specifically, the correction value generator 15 calculates the distribution of the luminance values of the image data D4, and generates a gradation correction curve so that the luminance level difference between the adjacent gradation values in the luminance level range in which the distribution is concentrated is increased and conversely, the luminance level difference between adjacent gradation values in the luminance level range in which the distribution is not concentrated is decreased.

FIG. 21 is a characteristic curve diagram showing an example of a gradation correction curve. The example of FIG. 21 is an example for when the image data D4 constitutes a high contrast image formed by a backlight or the like. The wide-dynamic-range correction unit 6 sets a γ curve in accordance with the image data D4 and expands the apparent dynamic range so that a low luminance portion is enhanced and a high luminance portion is suppressed. The correction value generator 15 generates a gradation correction curve so that a correction value C1 gradually rises from the value 1 in the image data D4 as a result of an increase in the luminance value, thereafter decreases to less than the value 1, and finally returns to the value 1. The correction value generator 15 generates the gradation correction value C1 on the basis of the luminance values of the image data D4 by using the generated gradation correction curve.

A multiplier 16 multiplies the gradation correction value C1 by the corresponding pixel values of the image data D4, thereby corrects the gradation of the image data D4, and outputs the image data D5.

In the skin-tone processor 7, a skin-tone area detector 17 detects pixels of the skin tone from the image data D5 output from the wide-dynamic-range correction unit 6, and outputs a skin-tone determination flag F1. As shown in FIG. 22, when the hue of the skin-tone portion is viewed in the HSV space, the skin tone varies over a range of 0 to 40 degrees. By using the deviation variation of the hue, the skin-tone area detector 17 generates image data of the color-difference signals Cr and Cb from the image data D5. Furthermore, by determining the signal level of the color-difference signals Cr and Cb, the hue of the image data is determined, the image data D4 belonging to the detection area of the skin tone, which is shown in FIG. 23, is detected, and the skin-tone determination flag F1 is output.

A parameter generator 18 counts, for each pixel of interest, the number of skin-tone determination flags F1 with regard to pixels in a predetermined range in the horizontal direction and in the vertical direction in which the pixel of interest is at the center, thereby obtains the number of skin-tone pixels in the predetermined range and detects the number of skin-tone pixels as the amount of skin tone. As shown in FIG. 24, the parameter generator 18 generates a parameter B whose value increases as the amount of skin tone increases and outputs it. The parameter B is a parameter for controlling the characteristics of a low-pass filter for performing a smoothing process on the skin-tone portion.

A low-pass filter (LPF) 19 decreases a cut-off frequency or increases the amount of attenuation in response to an increase in the parameter B and processes the image data D5, so that setting is performed in such a manner that the amount of suppression of higher frequency components is gradually changed in the contour portion of a face or the like. As a result, the higher frequency components of the image data D5 are suppressed in only the portion of the skin tone. More specifically, the low-pass filter 19 is formed of low-pass filters of two systems, which have different cut-off frequencies and attenuation ratios, and a weighted-addition circuit for performing weighted addition of the low-pass filter outputs of the two systems. The low-pass filter 19 smoothes the image data D5 by using the low-pass filters of the two systems and thereafter performs the weighted addition of the low-pass filter outputs of the two systems by using a weighting coefficient in accordance with the parameter B. Thus, an increase in the parameter B causes the cut-off frequency to be decreased or causes the amount of attenuation to be increased.

On the basis of a noise model of the image data D6, the noise suppression unit 8 performs a smoothing process on the image data D6 and outputs it, and a parameter generator 20 outputs a parameter for controlling the characteristics of the smoothing process. In the example of FIG. 20, the smoothing process is performed by an $\epsilon$ filter 21, and the parameter generator 20 outputs a threshold value $\epsilon 1$ of the $\epsilon$ filter 21 as a parameter for controlling the characteristics of the smoothing process.

The noise model is such that the amount of noise N that is mixed into the image data D6 until the image data D6 is input to the noise suppression unit 8 is formed as a mathematical expression. In the case of the electronic still camera 1, since the analog-to-digital conversion circuit 3 performs an analog-to-digital conversion process on the image-captured signal S1 output from the solid-state image-capturing element 2, a noise model is represented by the following equation:

$$N = a \times x1/2 + b \quad (1)$$

where a is the coefficient by light shot noise, b is the level of floor noise, and x is the pixel value of the pixel of interest. In equation (1), the term of $a \times x1/2$ on the right side is the amount of light shot noise that occurs in the photoelectric conversion process in the solid-state image-capturing element 2. b is the amount of noise that is mixed in from the time when stored electric charge of each pixel, which results from a photoelectric conversion process in the solid-state image-capturing element 2, is output as an image-captured signal S1 and an analog-to-digital conversion process is performed thereon by the analog-to-digital conversion circuit 3. Therefore, this noise model is changed by the solid-state image-capturing element 2, the analog-to-digital conversion circuit 3, and the like, which are used.

The parameter generator 20 applies the pixel value of each pixel of interest to the pixel value x of equation (1) in order to determine the amount of noise N for each pixel of interest by using a noise model, and outputs the amount of noise N as a threshold value $\epsilon 1$ of the $\epsilon$ filter 21. FIG. 25 is a characteristic curve diagram showing the relationship between the pixel value of the pixel of interest and the threshold value $\epsilon 1$ by using this noise model.

The $\epsilon$ filter 21 selects image data D6 to be processed on the basis of the threshold value $\epsilon 1$, performs a smoothing process thereon, thereby preventing deterioration of edge components, which are pattern components, and performs a noise suppression process.

In the $\epsilon$ filter 21, as shown in FIG. 26, a pixel-selection flag generator 22 receives, for each pixel of interest, image data of pixels d-4 to d-1, and d1 to d6 in a predetermined range in the horizontal direction and in the vertical direction, in which a pixel d0 of interest is at the center, via a memory (not shown), and detects pixels included in the range of the threshold value $\epsilon$ in which the pixel value of the pixel d0 of interest is at the center. The pixel-selection flag generator 22 outputs a determination flag F2 indicating that the detected pixel is to be processed. Therefore, in the example of FIG. 26, the determination flag F2 is output to the pixel d0 of interest in each of the pixels d-4, d-3, d-1, d1 to d3, d5, and d6 other than the pixels d-2 and d4.

On the basis of the determination flag F2, a low-pass filter (LPF) 23 selects image data to be processed, and performs a smoothing process thereon with respect to the pixel of interest, thereby suppressing the noise level of the image data D6, and outputs it.

At this point, regarding processing of the wide-dynamic-range correction unit 6, Japanese Unexamined Patent Application Publication No. 2001-298621 and corresponding U.S. Pat. No. 6,724,943 disclose a configuration in which edge components are stored and a WDR process is performed. Regarding an SK process, Japanese Unexamined Patent Application Publication No. 2006-41946 discloses a configuration in which occurrence of jitter is prevented and an SK process is performed. Regarding an NR process, Japanese Unexamined Patent Application Publication No. 2005-311455 discloses a configuration in which secondary differentiated values of image data in place of the pixel values of image data are determined using a threshold value $\epsilon$, and image data to be processed is selected. Regarding an NR process, Japanese Unexamined Patent Application Publication No. 2006-60744 discloses a configuration in which a threshold value of an $\epsilon$ filter is varied using an average value of the pixel values of the pixel of interest and surrounding pixels.

In the processing of image data of the structure shown in FIG. 20, after the gradation of the image data D4 is corrected to be of a non-linear type using a gradation correction curve in the wide-dynamic-range correction unit 6, in the noise suppression unit 8, the noise level is suppressed using the threshold value $\epsilon 1$ in accordance with the noise model. Therefore, in the noise suppression unit 8, there is a problem in that it is difficult to correctly suppress noise by using a noise model due to an influence of the gradation correction curve. As a result, in the configuration shown in FIG. 20, for example, when the low luminance portion is enhanced in the wide-dynamic-range correction unit 6, it becomes difficult to sufficiently suppress the noise level increased in the low luminance portion due to the enhancement of the low luminance portion, and there is a problem in that the noise level increases in the low luminance portion.

SUMMARY OF THE INVENTION

It is desirable to provide an image processing apparatus and an image processing method capable of correctly suppressing noise in accordance with a noise model in a case where the gradation is corrected and thereafter noise is suppressed in accordance with a noise model.

According to an embodiment of the present invention, there is provided an image processing apparatus including: a gradation correction unit configured to multiply input image data by a gradation correction value appropriate for the input image data so as to obtain gradation corrected image data; and a noise suppression unit configured to suppress noise of the gradation corrected image data on the basis of a noise model of the input image data so as to obtain output image data, wherein the noise suppression unit includes a parameter generator configured to generate a noise suppression parameter in accordance with the gradation corrected image data by using the noise model; a parameter correction unit configured to multiply the noise suppression parameter by the gradation correction value so as to correct the noise suppression parameter; and a low-pass filter configured to vary characteristics thereof in accordance with the noise suppression parameter corrected by the parameter correction unit and to suppress noise of the gradation corrected image data.

The noise suppression unit may include a specific color detector configured to determine hue of the gradation corrected image data and to detect pixels of a specific color; a specific color correction parameter generator configured to, on the basis of a detection result of the specific color detector, generate a specific color correction parameter for varying the characteristics of the low-pass filter so that the amount of noise suppression is increased in the portion of the specific color of the input image data; and a parameter combining unit configured to combine the noise suppression parameter corrected by the parameter correction unit and the specific color correction parameter in order to generate a parameter for varying the characteristics of the low-pass filter and to output the parameter for varying the characteristics to the low-pass filter.

The gradation correction unit may measure a distribution of luminance values of the input image data, and may generate the gradation correction value so that a luminance level difference between adjacent gradation values in a luminance level range in which the distribution is concentrated is increased.

The low-pass filter may be an ε filter that varies a threshold value thereof in accordance with the noise suppression parameter corrected by the parameter correction unit.

The low-pass filter may include first and second low-pass filters configured to receive the gradation corrected image data, the first and second low-pass filters having different characteristics; and a weighted addition unit configured to perform weighted addition of output data of the first and second low-pass filters by using weighting coefficients, wherein the weighting coefficients are varied in accordance with the noise suppression parameter corrected by the parameter correction unit in order to vary the characteristics.

According to another embodiment of the present invention, there is provided an image processing method including the steps of: obtaining gradation corrected image data by multiplying input image data by a gradation correction value appropriate for the input image data; and obtaining output image data by suppressing noise of the gradation corrected image data on the basis of a noise model of the input image data, wherein, in the step of obtaining the output image data, a noise suppression parameter is generated in accordance with the gradation corrected image data by using the noise model, the noise suppression parameter is multiplied by the gradation correction value in order to correct the noise suppression parameter, and noise of the gradation corrected image data is suppressed in accordance with characteristics varied in accordance with the corrected noise suppression parameter.

BRIEF DESCRIPTION OF THE DRAWINGS

FIG. 11 is a table showing coefficients of a first low-pass filter of FIG. 10;

FIG. 12 is a table showing coefficients of a second low-pass filter of FIG. 10;

DESCRIPTION OF THE PREFERRED EMBODIMENTS

Embodiments of the present invention will be described in detail below with reference to the drawings as appropriate.

First Embodiment (1) Configuration of First Embodiment

Figure 2:
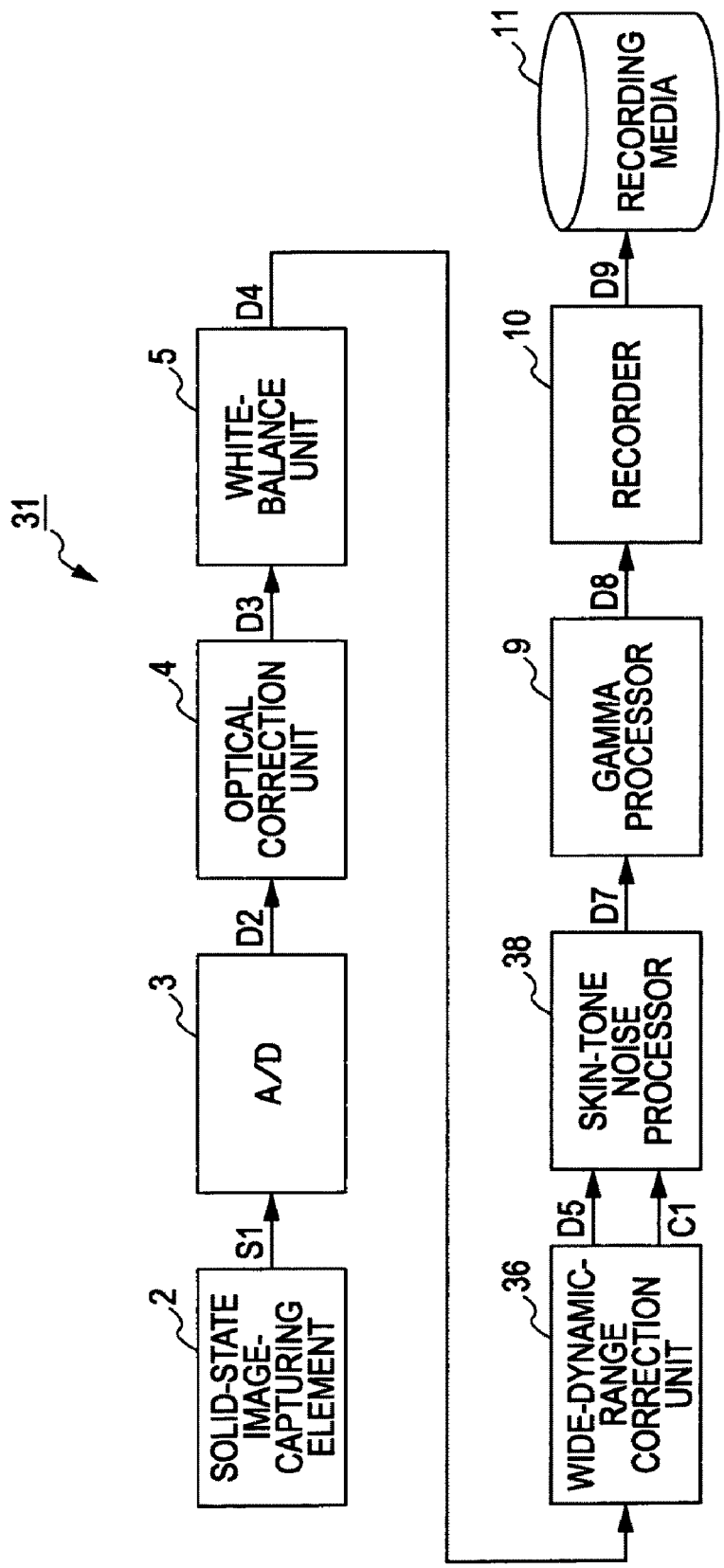
FIG. 2 is a block diagram showing the configuration of the electronic still camera according to the first embodiment of the present invention.
Figure 19:
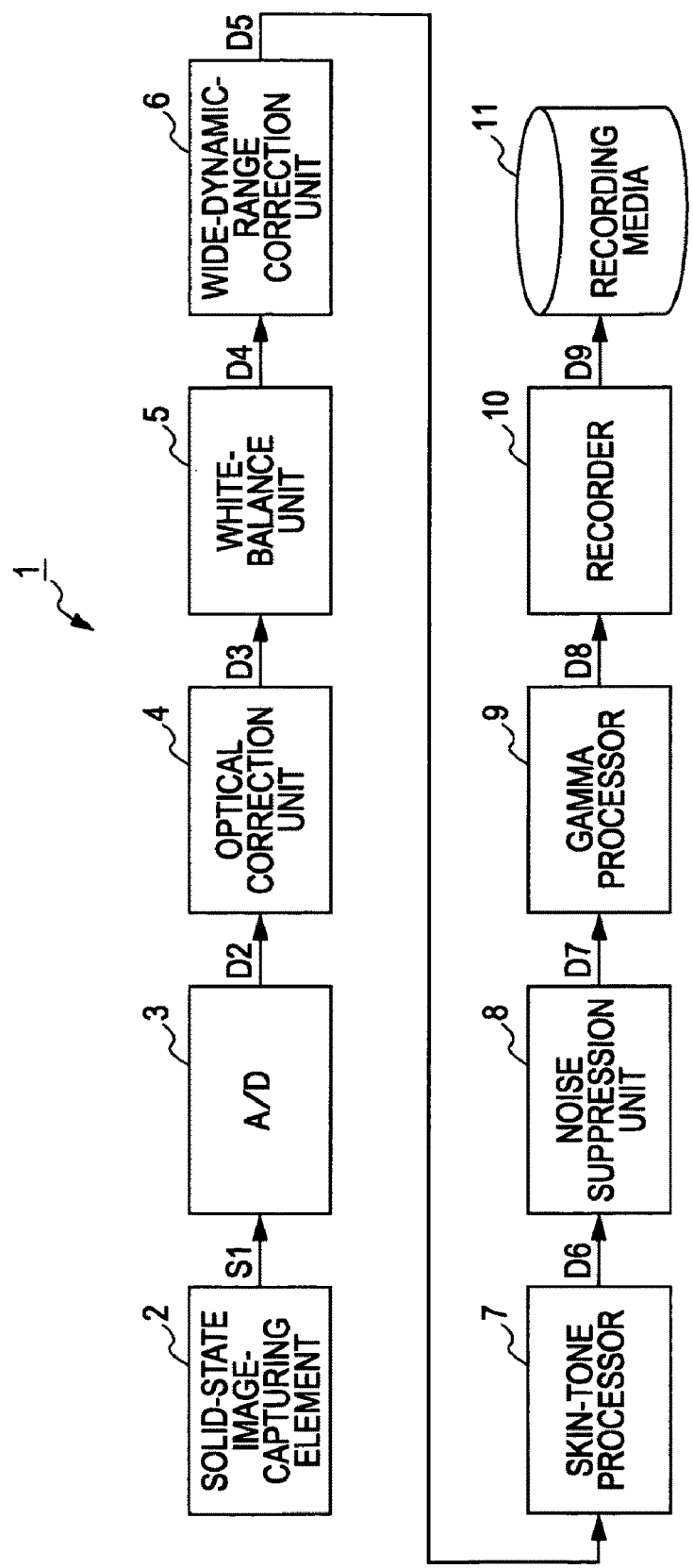
FIG. 19 is a block diagram showing an electronic still camera of the related art.

FIG. 2 is a block diagram showing an electronic still camera according to a first embodiment of the present invention. In an electronic still camera 31, components identical to those of the electronic still camera 1 of FIG. 19 are designated with the corresponding reference numerals, and descriptions thereof are omitted herein. The electronic still camera 31 is provided with a wide-dynamic-range correction unit 36 and a skin-tone noise processor 38 in place of the wide-dynamic-range correction unit 6, the skin-tone processor 7, and the noise suppression unit 8, and is configured the same as the electronic still camera 1 of FIG. 19 except that a WDR process, an SK process, and an NR process are performed by the wide-dynamic-range correction unit 36 and the skin-tone noise processor 38.

Figure 1:
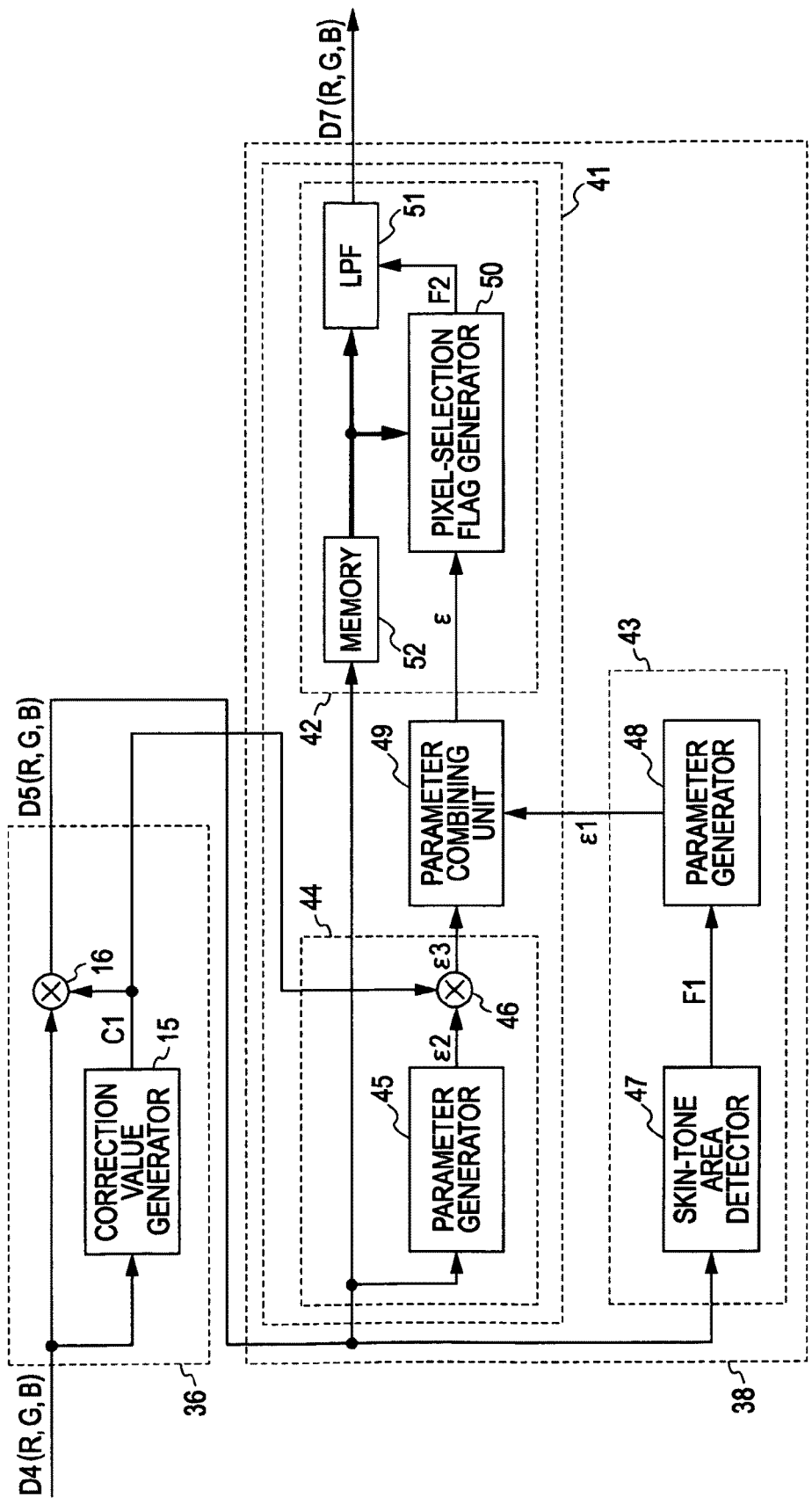
FIG. 1 is a block diagram showing the configuration of a wide-dynamic-range correction unit applied to an electronic still camera according to a first embodiment of the present invention.

FIG. 1 is a block diagram showing a detailed configuration of the wide-dynamic-range correction unit 36 and the skin-tone noise processor 38. The wide-dynamic-range correction unit 36 is configured the same as the wide-dynamic-range correction unit 6 of FIG. 20 except that a gradation correction value C1 output from the correction value generator 15 is output to the multiplier 16 and the skin-tone noise processor 38. The wide-dynamic-range correction unit 36 generates a gradation correction curve on the basis of the luminance distribution of the image data D4, generates a gradation correction value C1 on the basis of the luminance values of the image data D4 by using a gradation correction curve, corrects the gradation of the image data D4 by using the gradation correction value C1, and outputs image data D5.

In the skin-tone noise processor 38, a noise suppression unit 41 suppresses the noise level of the image data D5 output from the wide-dynamic-range correction unit 36 by using a low-pass filter using an $\epsilon$ filter 42, thereby performing an NR process on the image data D5. Furthermore, the noise suppression unit 41 varies the characteristics of the $\epsilon$ filter 42 by using a parameter detected by the skin-tone unit 43 and thereafter performs an SK process. For this reason, in the skin-tone noise processor 38, a noise detector 44 detects a parameter for controlling the characteristics of the $\epsilon$ filter 42 for the purpose of the NR process.

Figure 3:
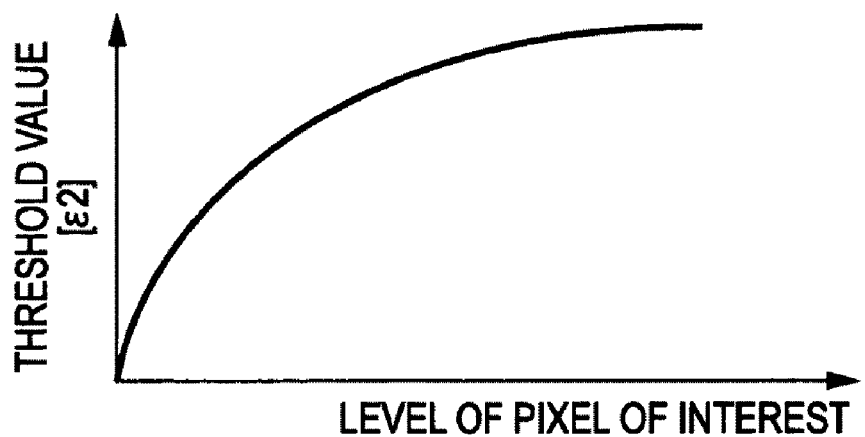
FIG. 3 is a characteristic curve diagram showing a noise model.

That is, as shown in FIG. 3, a parameter generator 45 generates a threshold value $\epsilon 2$, which is a parameter for suppressing noise, for controlling the characteristics of the $\epsilon$ filter 42 by using a noise model on the basis of the pixel values of the image data D4. A multiplier 46 multiplies the gradation correction value C1 output from the wide-dynamic-range correction unit 36 by the threshold value $\epsilon 2$, thereby correcting the threshold value $\epsilon 2$ generated by the parameter generator 45 using the gradation correction value C1, and outputs a threshold value $\epsilon 3$. As a result, the threshold value $\epsilon 2$ is corrected in such a manner as to deal with the correction of the gradation in the wide-dynamic-range correction unit 36.

The skin-tone unit 43 outputs a skin-tone correcting parameter for varying the characteristics of a low-pass filter in the SK process in such a manner as to deal with the parameter using the threshold value $\epsilon 3$ output from the multiplier 46.

Figure 4:
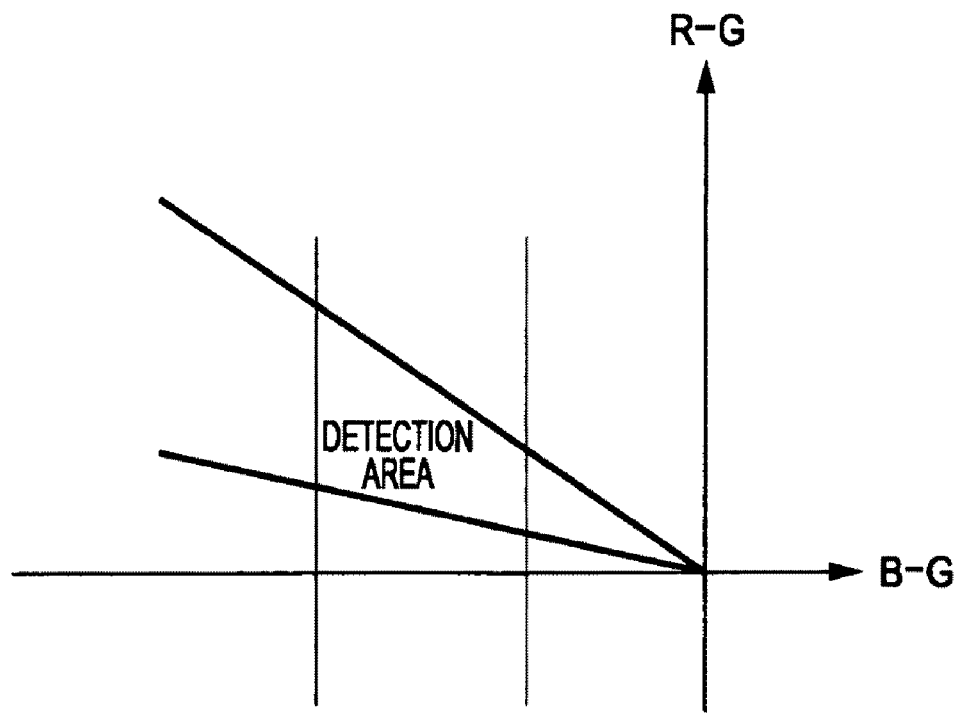
FIG. 4 is a characteristic curve diagram showing a detection area of skin tone.

In the skin-tone unit 43, a skin-tone area detector 47 detects pixels of the skin tone similarly to that described above with reference to FIG. 20, and outputs a skin-tone determination flag F1. The skin-tone area detector 47 subtracts green data G from red data R and blue data B constituting the image data D5 in order to generate difference signals R-G and B-G, and detects pixels belonging to the detection area of the skin tone by using the difference signals R-G and B-G, as shown in FIG. 4.

Figure 5:
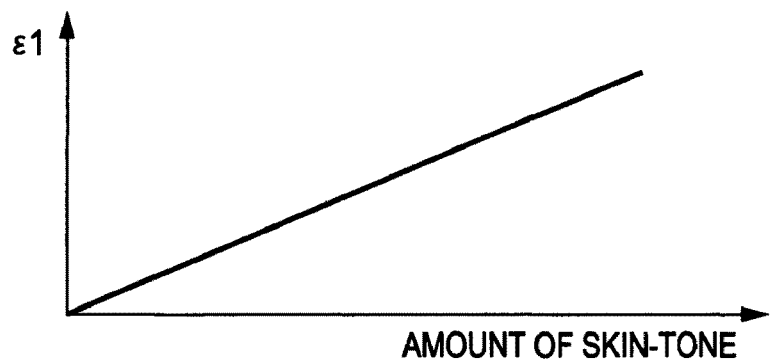
FIG. 5 is a characteristic curve diagram illustrating a skin-tone correction parameter.

A parameter generator 48 detects the amount of skin tone by counting the number of skin-tone determination flags F1 for each pixel of interest with regard to pixels in a predetermined range in the horizontal direction and in the vertical direction in which the pixel of interest is at the center. As shown in FIG. 5, the parameter generator 48 generates a threshold value $\epsilon 1$ whose value increases as the amount of skin tone increases, and outputs it.

More specifically, in the present embodiment, this predetermined range is set to a range of 7×7 pixels in which the pixel of interest is at the center. The parameter generator 48 divides the amount of skin tone, which is a value corresponding to the number of skin-tone determination flags F1, by the number of pixels 49 in this predetermined area in order to determine a divided value $\alpha$. The parameter generator 48 multiplies the divided value $\alpha$ by a constant K that is set in advance in order to determine a threshold value $\epsilon 1$ (K×$\alpha$).

A parameter combining unit 49 combines the threshold value $\epsilon 3$ output from the noise detector 44 and the threshold value $\epsilon 2$ generated by the skin-tone unit 43, and finally calculates a threshold value $\epsilon$, which is a parameter for controlling the characteristics of the $\epsilon$ filter 42. In the present embodiment, the parameter combining unit 49 selects a larger threshold value of the two threshold values $\epsilon 1$ and $\epsilon 3$, and outputs the threshold value $\epsilon$.

The $\epsilon$ filter 42 selects image data D5 to be processed by using the threshold value $\epsilon$ output from the parameter combining unit 49 and performs a smoothing process thereon. In the $\epsilon$ filter 42, a memory 52 temporarily holds the image data D5 that is input sequentially. Furthermore, pixels in a predetermined range in the horizontal direction and in the vertical direction in which the pixel of interest is at the center are concurrently output from the held image data D5. Here, in the present embodiment, this predetermined range is set to a range of 7×7 pixels in which the pixel of interest is at the center.

A pixel-selection flag generator 50 detects image data included in the range of the threshold value $\epsilon$ in which the pixel value of the pixel of interest is at the center from the image data output from the memory 52, and thereby outputs a determination flag F2.

On the basis of the determination flag F2, a low-pass filter (LPF) 51 select the image data to be processed from the image data output from the memory 52 and performs a smoothing process thereon, and thereby outputs image data D7 on which the NR process and the SK process have been performed.

(2) Operation of First Embodiment

In the above configuration, in the electronic still camera 31 (FIG. 2), the image-captured signal S1 output from the solid-state image-capturing element 2 is subjected to an analog-to-digital conversion process by the analog-to-digital conversion circuit 3, thereby generating image-captured data D2, and this image-captured data D2 is converted into image data D3 formed of color data of red, green, and blue by the optical correction unit 4. This image data D3 is white-balance-adjusted by the white-balance unit 5 and is WDR-processed by the wide-dynamic-range correction unit 36. Furthermore, after the image data D5 output from the wide-dynamic-range correction unit 36 is subjected to an SK process and an NR process by the skin-tone noise processor 38, the image data D5 is gamma-corrected by the gamma processor 9, and is recorded on the recording medium 11 by the recorder 10.

In the processing in the wide-dynamic-range correction unit 36 (FIG. 1), the luminance distribution of the image data D4 is detected by the correction value generator 15, and a gradation correction curve is generated on the basis of the luminance distribution so that the luminance level difference between adjacent gradation values in the luminance level range in which the distribution is concentrated is increased and conversely, the luminance level difference between adjacent gradation values in the luminance level range in which the distribution is not concentrated is decreased. On the basis of the gradation correction curve, a gradation correction value C1 for correcting the gradation of each pixel is generated, and the gradation correction value C1 is multiplied by the image data D4, so that the apparent gradation is enhanced.

In the subsequent process in the skin-tone noise processor 38, in the parameter generator 45, a noise suppression parameter $\epsilon 2$ is generated in accordance with the image data D5 by using a noise model. In the multiplier 46, after the noise suppression parameter $\epsilon 2$ is corrected using the gradation correction value C1, the noise suppression parameter $\epsilon 2$ is output to the $\epsilon$ filter 42 via the parameter combining unit 49, and the characteristics of the $\epsilon$ filter 42 are controlled.

Therefore, in order to deal with correction of the gradation in the wide-dynamic-range correction unit 36, the threshold value $\epsilon 2$ generated by the parameter generator 45 is corrected using the gradation correction value C1, making it possible to perform a noise suppression process. That is, even when noise is suppressed on the basis of the noise model after the gradation is corrected, it is possible to correctly suppress noise in accordance with the noise model. For example, when a low luminance portion in a high contrast image due to a backlight or the like is enhanced, the noise level increases in the low luminance portion. In the present embodiment, the amount of noise suppression is increased in the low luminance portion in such a manner as to deal with the enhancement in the low luminance portion, thereby making it possible to sufficiently suppress the noise level.

In the present embodiment, in the skin-tone area detector 47, pixels of the skin tone are detected. In the subsequent parameter generator 48, the amount of pixels of the skin tone in the predetermined range in which the pixel of interest is at the center is detected, and a skin-tone correction parameter $\epsilon 1$ with which an SK process is performed using the $\epsilon$ filter 42 in accordance with the amount of pixels of the skin tone is generated.

In the parameter combining unit 49, the parameter $\epsilon 1$ for correcting skin tone is combined with the noise suppression parameter $\epsilon 3$ output from the multiplier 46, thereby generating a parameter $\epsilon$ for varying the characteristics of the $\epsilon$ filter 42, and the parameter $\epsilon$ enables the characteristics of the $\epsilon$ filter 42 to be controlled.

Figure 20:
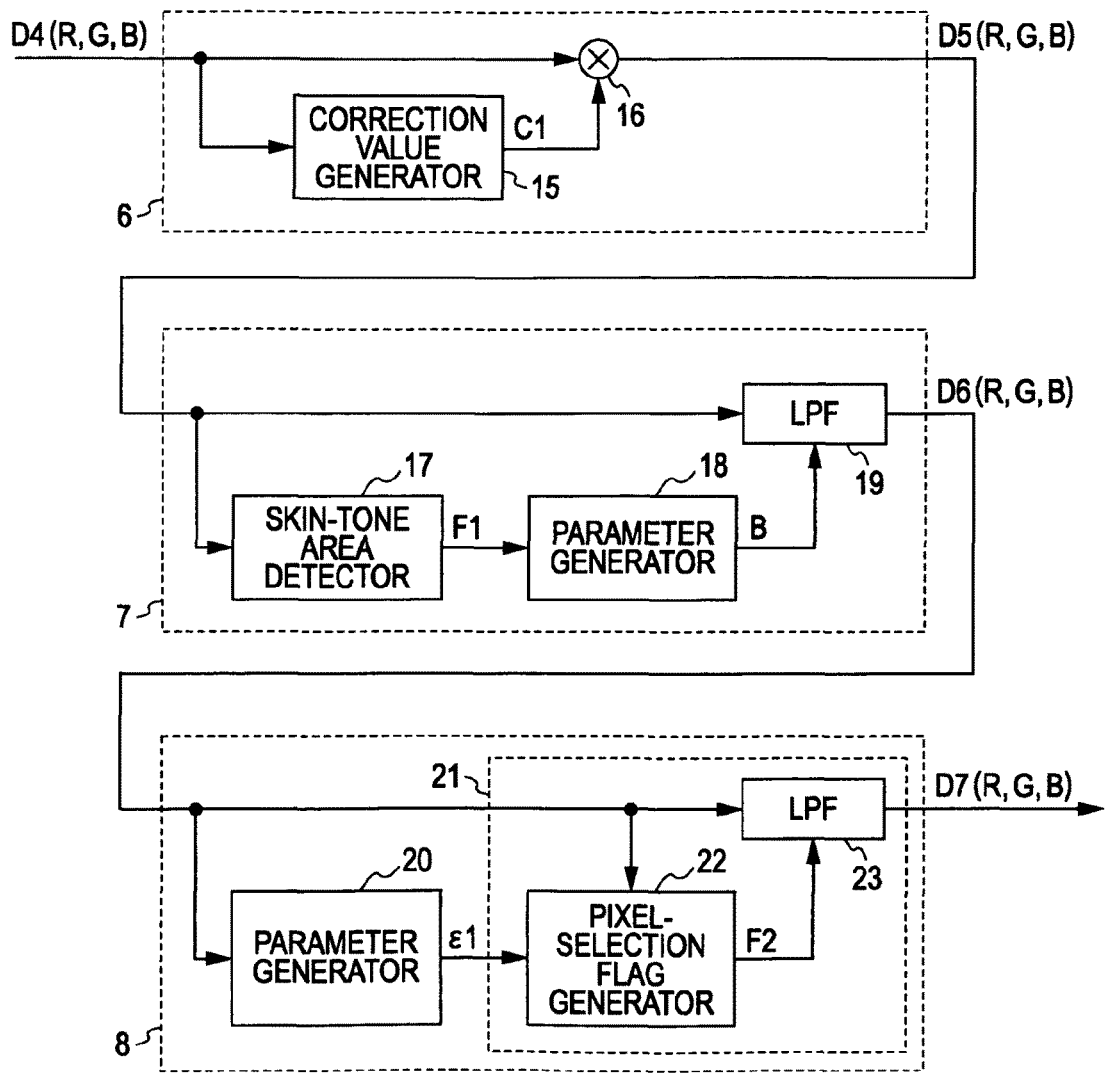
FIG. 20 is a block diagram showing the configuration of a wide-dynamic-range correction unit and the like in the electronic still camera of FIG. 1.
Figure 21:
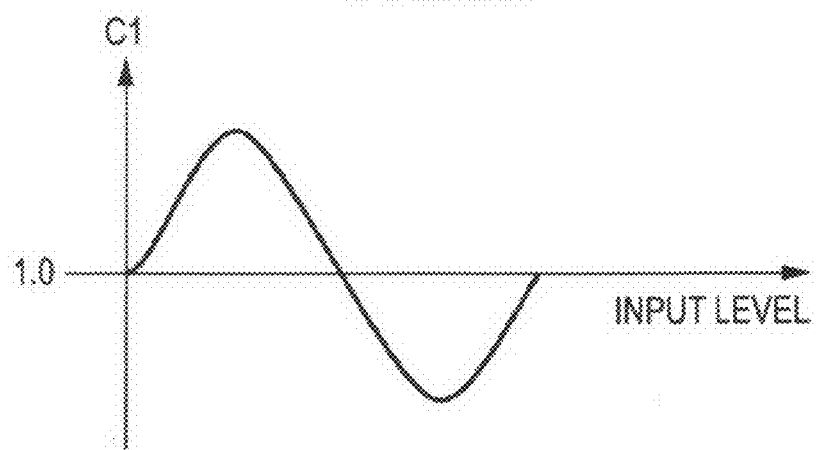
FIG. 21 is a characteristic curve diagram illustrating a gradation correction value.
Figure 22:
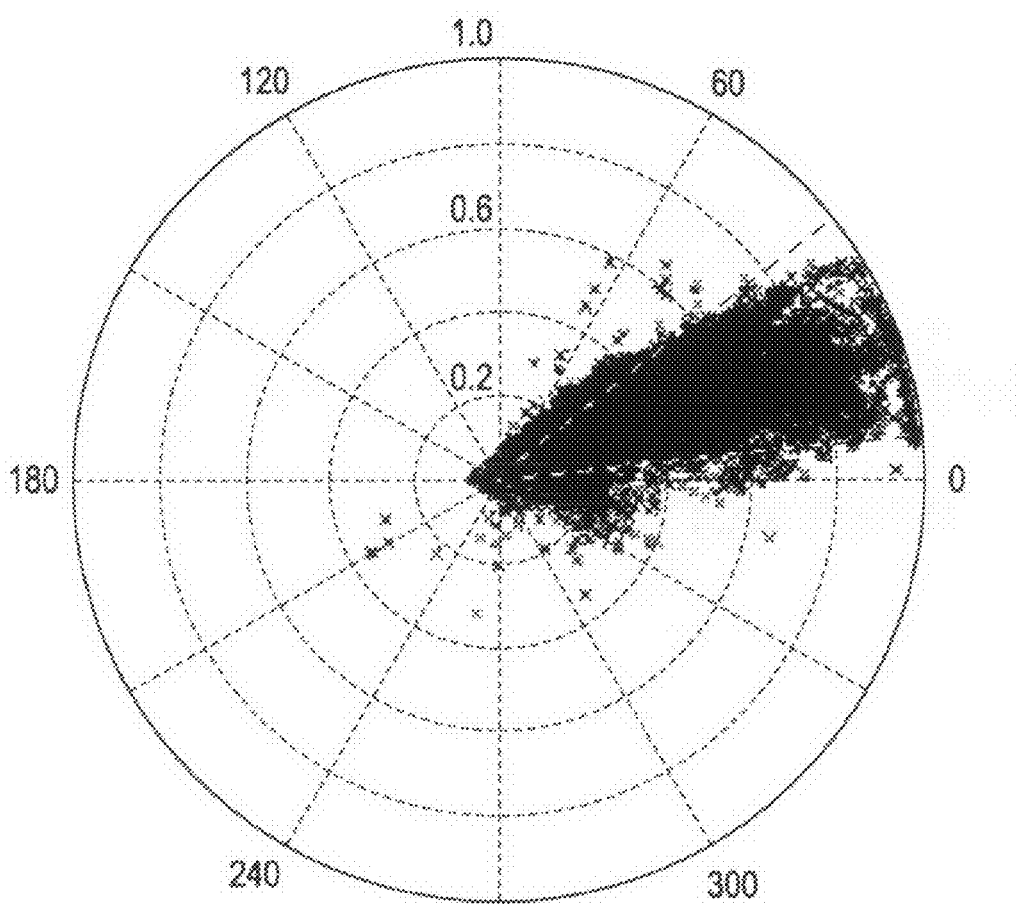
FIG. 22 is a characteristic curve diagram illustrating an SK process.
Figure 23:
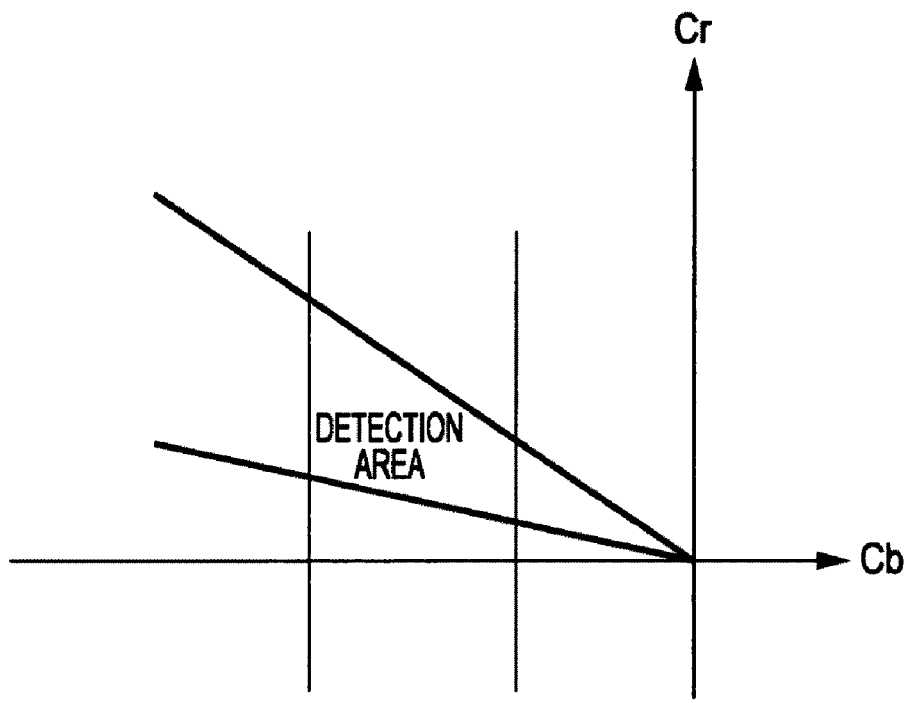
FIG. 23 is a characteristic curve diagram showing a detection area of skin tone.
Figure 24:
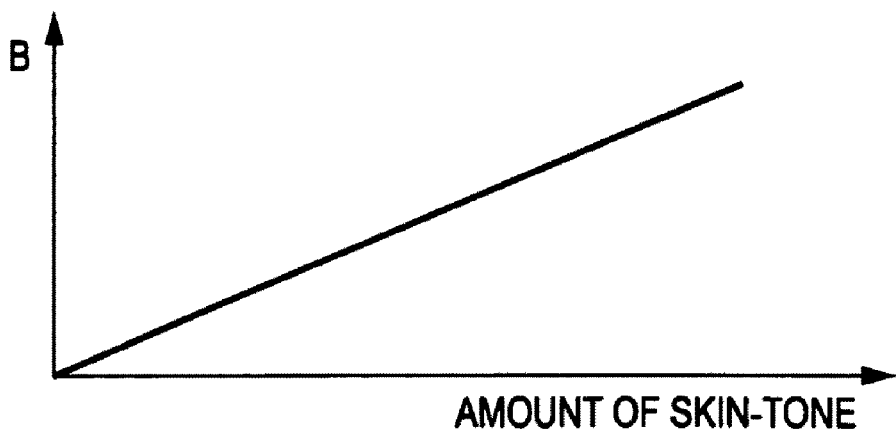
FIG. 24 is a characteristic curve diagram illustrating a skin-tone correction parameter.
Figure 25:
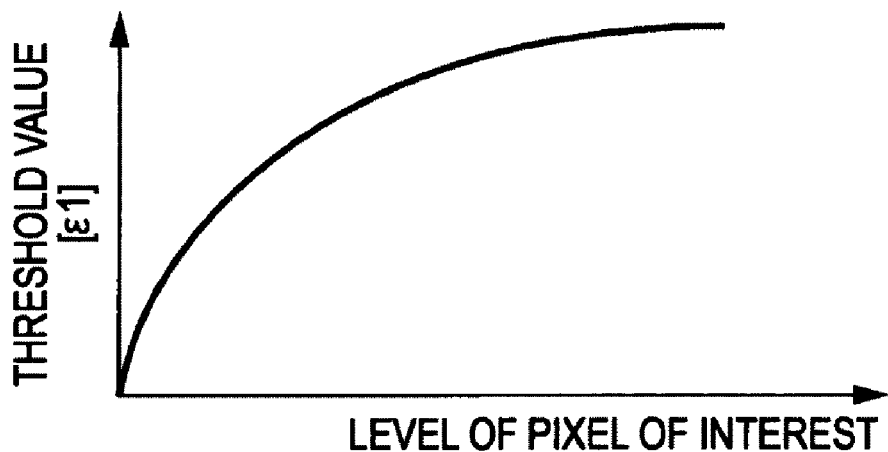
FIG. 25 is a characteristic curve diagram illustrating a noise model.
Figure 26:
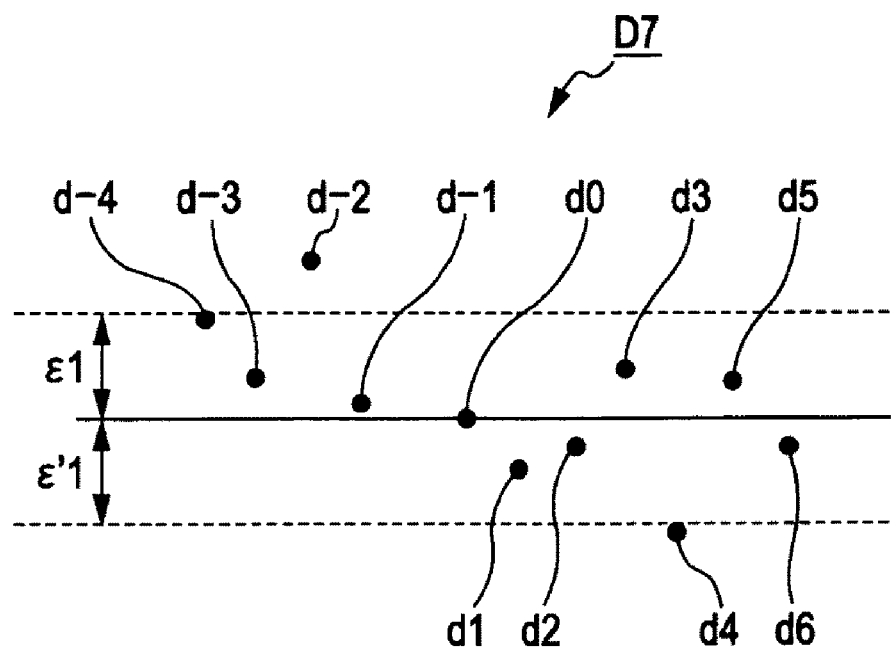
FIG. 26 is a diagram illustrating an ε filter.

As a result, in the electronic still camera 31, an NR process and an SK process are performed by sharing the low-pass filter inside the $\epsilon$ filter 42, and the configuration can be simplified when compared to the configuration of the related art shown in FIG. 20.

That is, in the configuration of the related art shown in FIG. 20, it is necessary to provide a two-dimensional low-pass filter in each of the NR process and the SK process. Since the two-dimensional low-pass filter is configured, it is necessary to provide a memory for each of them. Therefore, the configuration becomes complex and furthermore, power consumption is increased.

Figure 6:
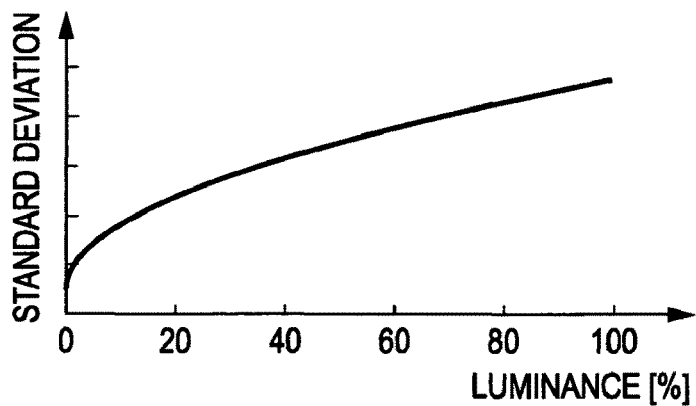
FIG. 6 is a characteristic curve diagram showing a specific example of a noise model.
Figure 7:
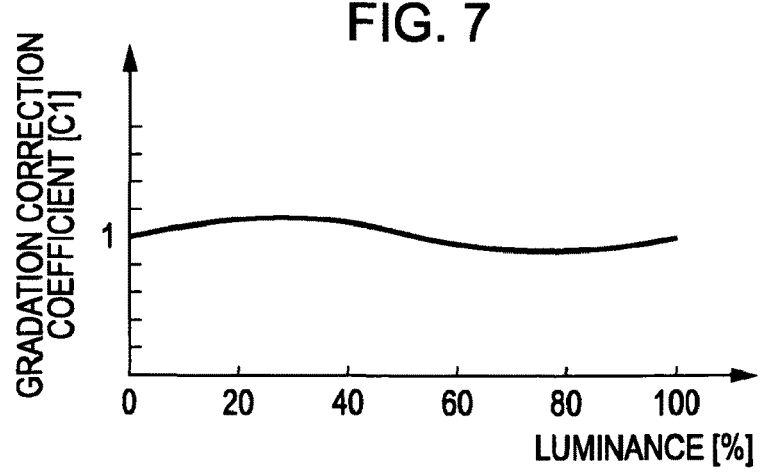
FIG. 7 is a characteristic curve diagram showing a specific example of a gradation correction coefficient.
Figure 8:
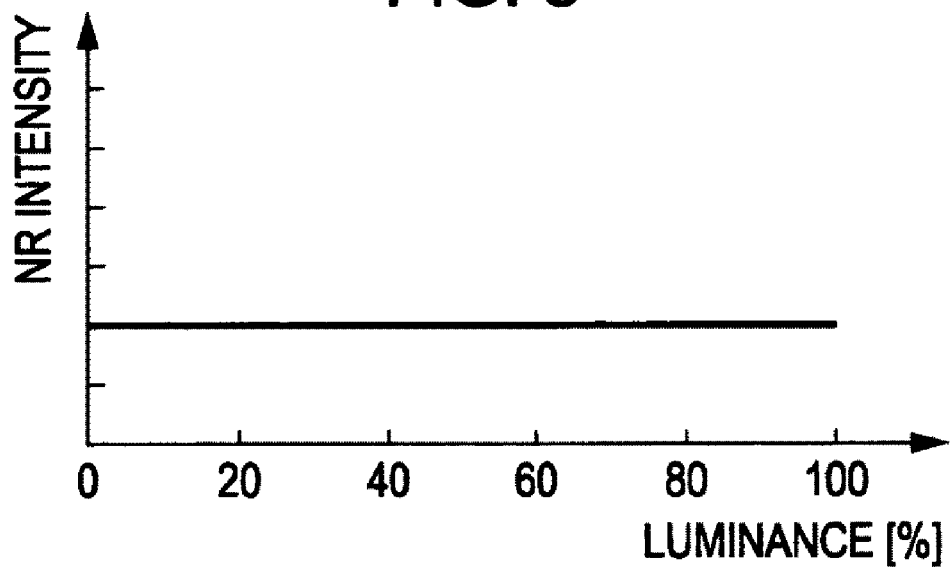
FIG. 8 is a characteristic curve diagram showing the amount of noise suppression of an SK process.
Figure 9:
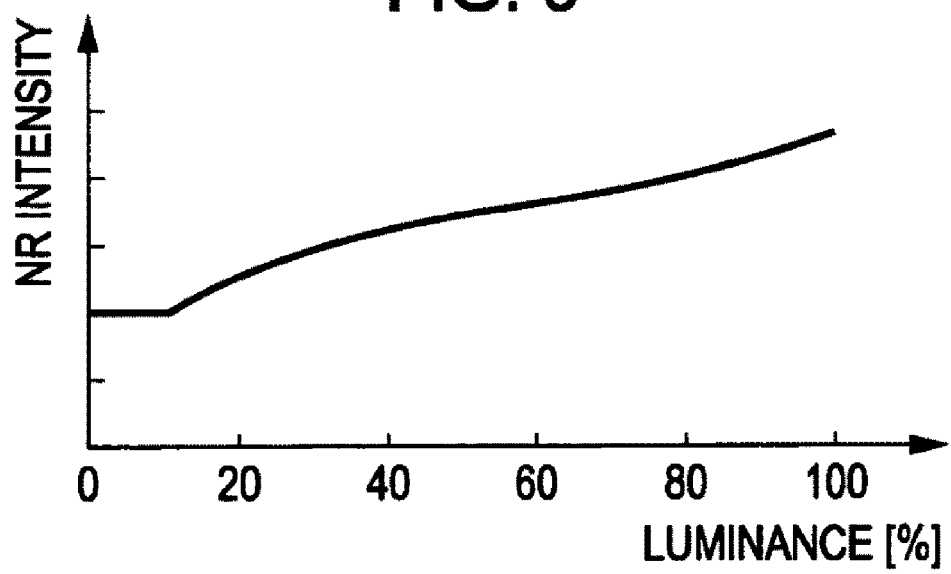
FIG. 9 is a characteristic curve diagram showing characteristics of a noise suppression process using characteristics of FIGS. 6 to 8.

FIG. 6 is a characteristic curve diagram showing a specific noise model. FIG. 7 is a characteristic curve diagram showing an example of a gradation correction value C1. FIG. 8 is a characteristic curve diagram showing the amount of noise suppression of the SK process in the skin-tone portion. FIG. 9 is a characteristic curve diagram showing characteristics of the $\epsilon$ filter 42 in a case where the parameters $\epsilon 1$ and $\epsilon 2$ are generated on the basis of the characteristics of FIGS. 6 to 8. It can be seen from the characteristic curve of FIG. 9 that the amount of noise suppression is changed in such a manner as to deal with the WDR process, and noise suppression can be correctly performed in accordance with the noise model. It can also be seen that noise of the skin tone can be sufficiently suppressed in the low luminance portion in which noise is noticeable.

Second Embodiment

Figure 10:
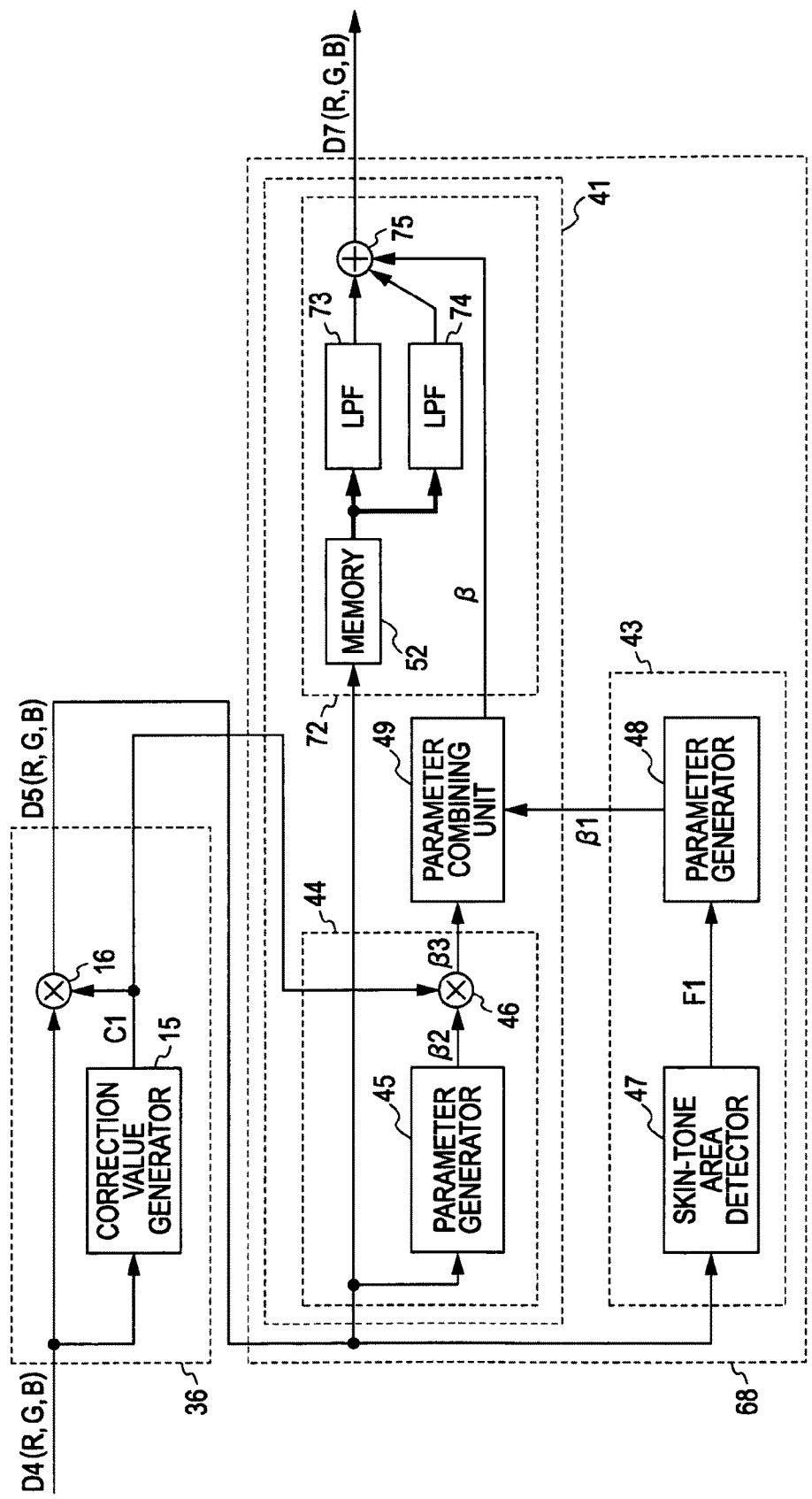
FIG. 10 is a block diagram showing the configuration of a wide-dynamic-range correction unit and the like that are applied to an electronic still camera according to a second embodiment of the present invention.

FIG. 10 is a block diagram showing the configuration of a skin-tone noise processor applied to an electronic still camera according to a second embodiment of the present invention. The electronic still camera of the present embodiment is configured the same as the electronic still camera 31 of FIG. 2 except that a skin-tone noise processor 68 shown in FIG. 10 is applied in place of the skin-tone noise processor 38. Here, the skin-tone noise processor 68 is configured the same as the skin-tone noise processor 38 of FIG. 1 except that a low-pass filter 72 is applied in place of the $\epsilon$ filter 42 and the configuration regarding the low-pass filter 72 differs therefrom.

Figures 11, 12:
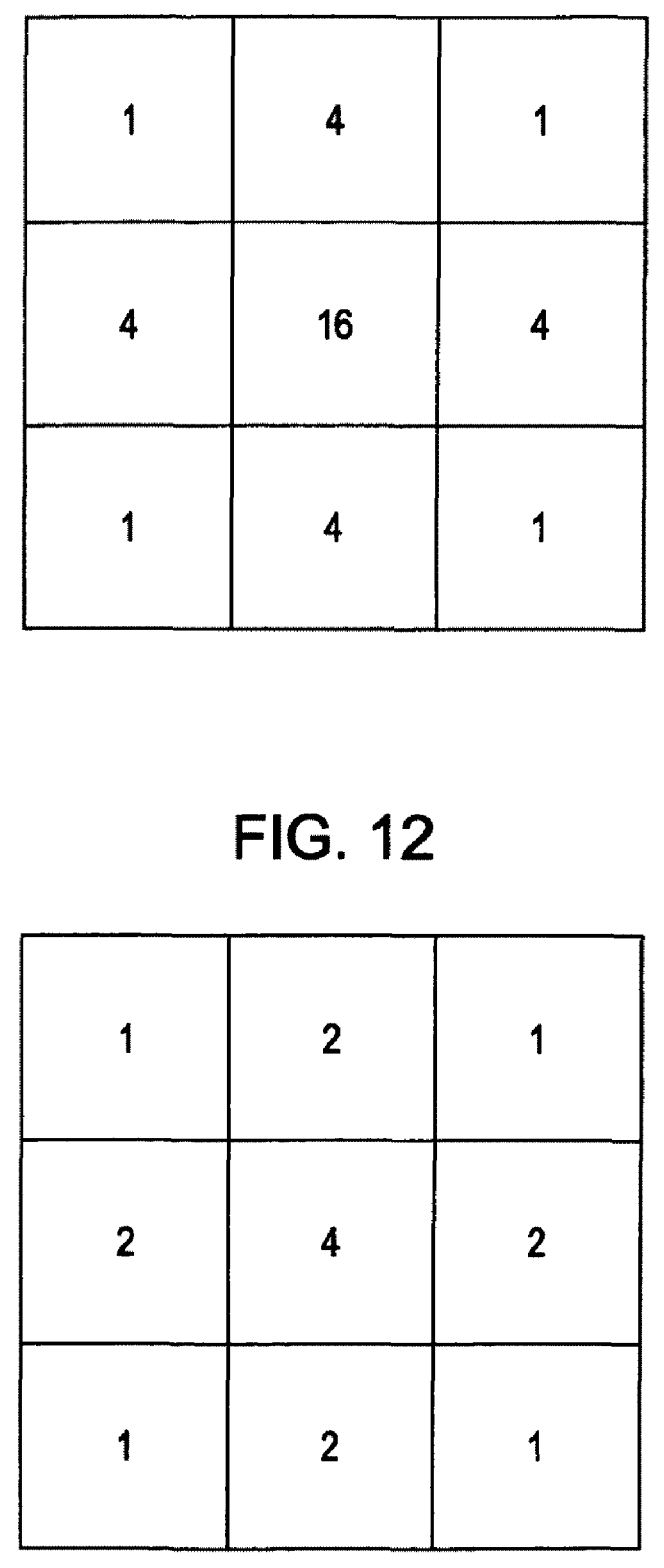

Here, the low-pass filter 72 includes a first low-pass filter 73 and a second low-pass filter 74 having different characteristics, and a weighted-addition circuit 75 for performing weighted addition of outputs of the low-pass filters 73 and 74 using a weighting coefficient based on a blend ratio $\beta$. In FIGS. 11 and 12, the tap coefficients of the first low-pass filter 73 and a second low-pass filter 74 are shown. The characteristics of the low-pass filter 72 are varied by varying the blend ratio $\beta$. The parameter generators 45 and 48 generate a noise suppression parameter and a skin-tone correction parameter by using the blend ratios $\beta 2$ and $\beta 1$, respectively, and output them. The parameter combining unit 49 combines the blend ratios $\beta 2$ and $\beta 1$ and outputs a blend ratio $\beta$. The method for generating the blend ratios $\beta 2$ and $\beta 1$ in the parameter generators 45 and 48 is the same as the method of generating the threshold values $\epsilon 2$ and $\epsilon 1$, which is described above with reference to FIG. 1, and the method for combining parameters in the parameter combining unit 49 is the same as the method for combining the threshold values $\epsilon 2$ and $\epsilon 1$.

As described in the present embodiment, a low-pass filter may be configured by performing weighted addition of outputs of a plurality of low-pass filters having different characteristics.

Third Embodiment

Figure 13:
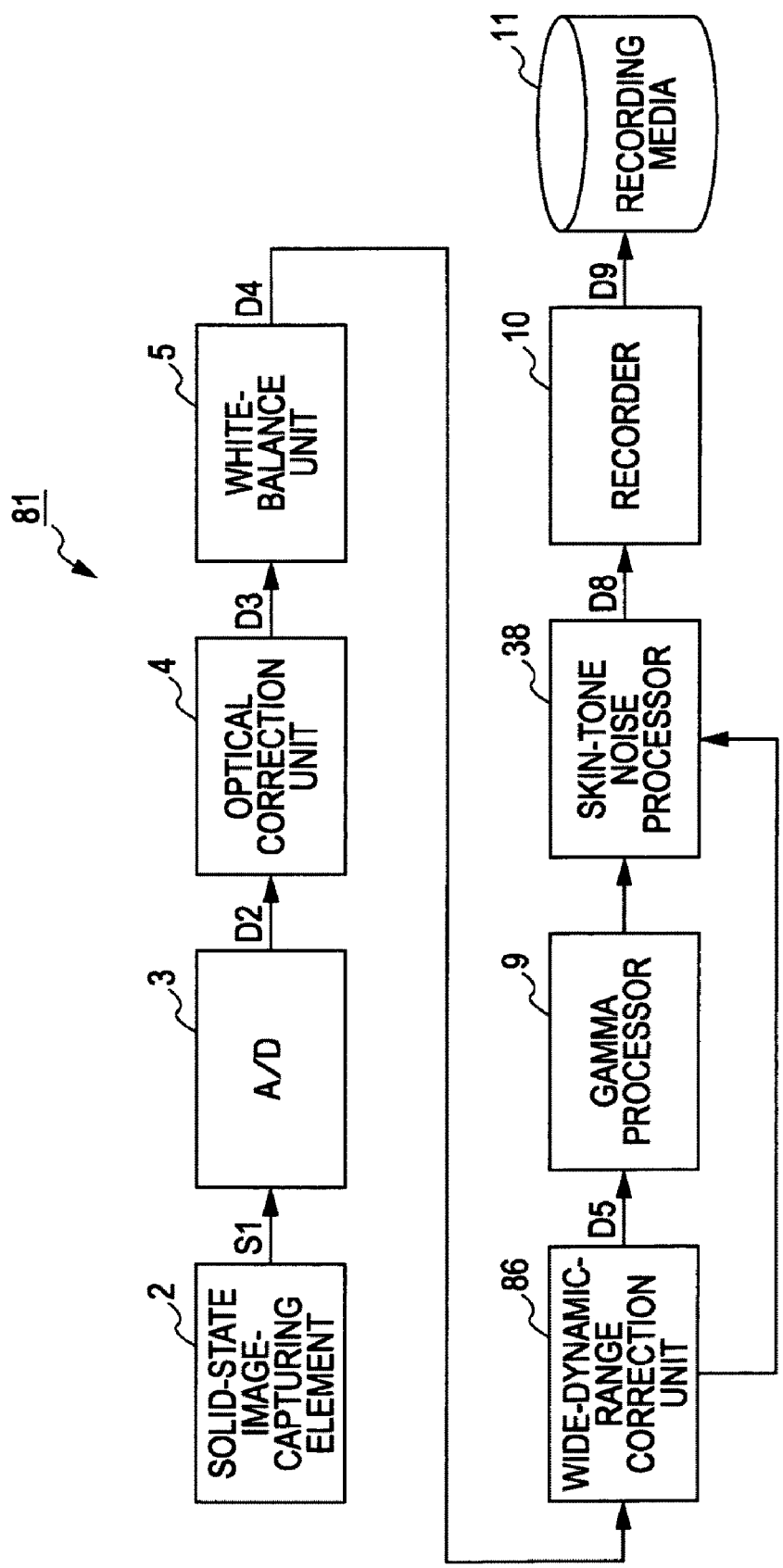
FIG. 13 is a block diagram showing the configuration of an electronic still camera according to a third embodiment of the present invention.

FIG. 13, in contrast with FIG. 2, is a block diagram showing the configuration of an electronic still camera according to a third embodiment of the present invention. In an electronic still camera 81 of the present embodiment, the gamma processor 9 is provided between a wide-dynamic-range correction unit 86 and the skin-tone noise processor 38 in place of between the skin-tone noise processor 38 and the recorder 10. Therefore, in the electronic still camera 81, the gradation that is corrected to be of a non-linear type by the wide-dynamic-range correction unit 86 is further corrected to be of a non-linear type by the gamma processor 9.

Figure 14:
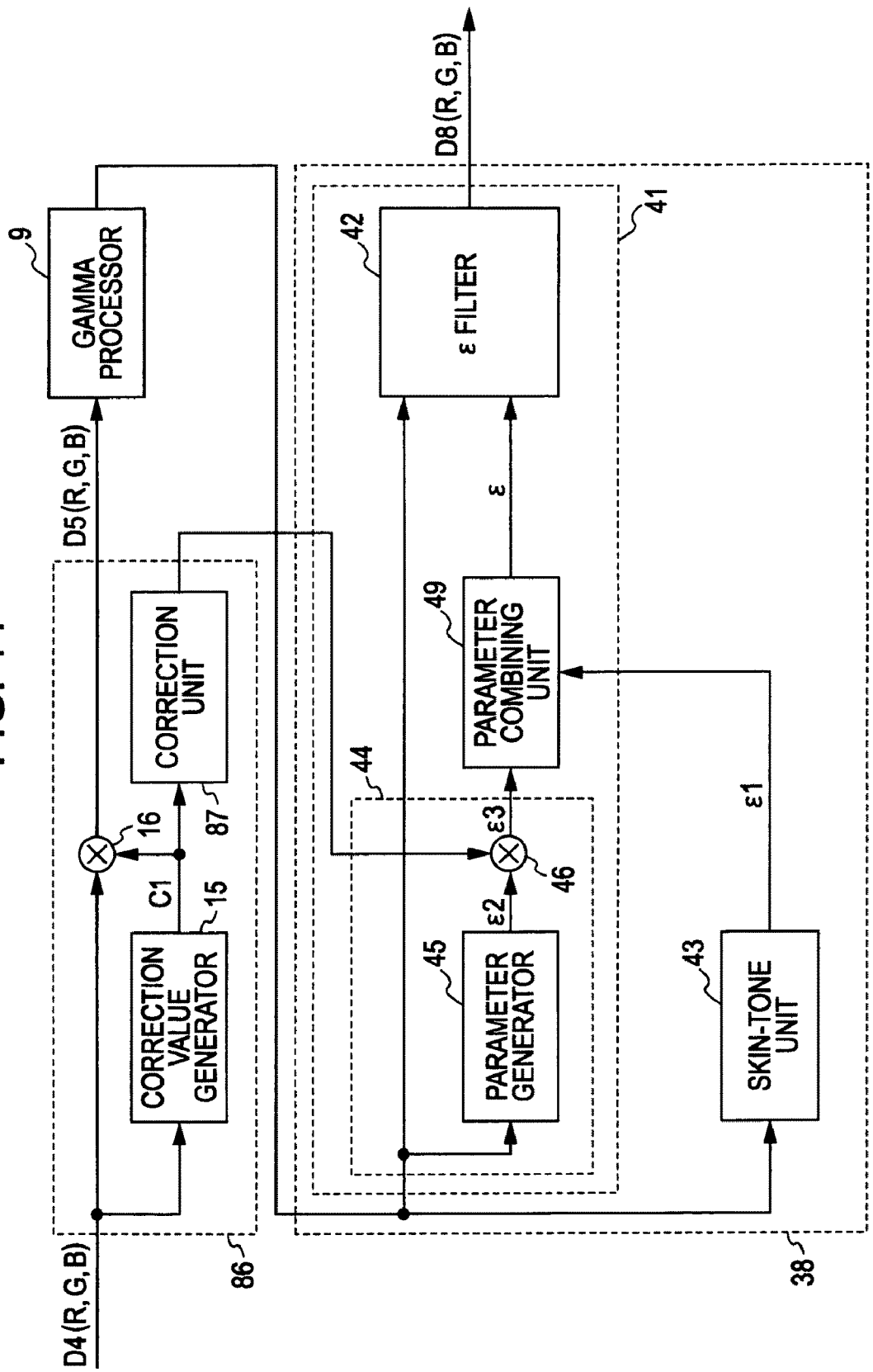
FIG. 14 is a block diagram showing the configuration of a wide-dynamic-range correction unit and the like that are applied to the electronic still camera of FIG. 13.
Figure 15:
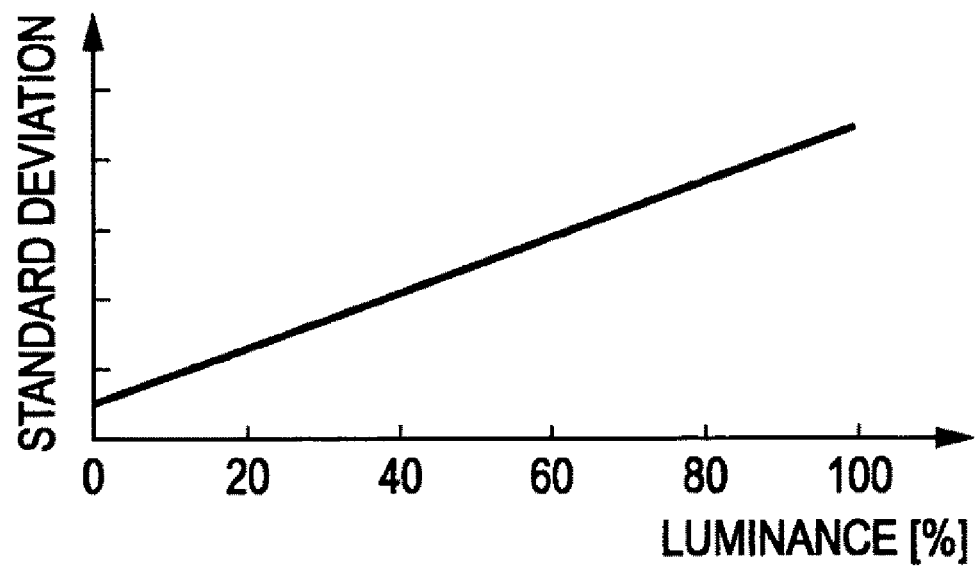
FIG. 15 is a characteristic curve diagram showing a specific example of a noise model using a primary function equation.
Figure 16:
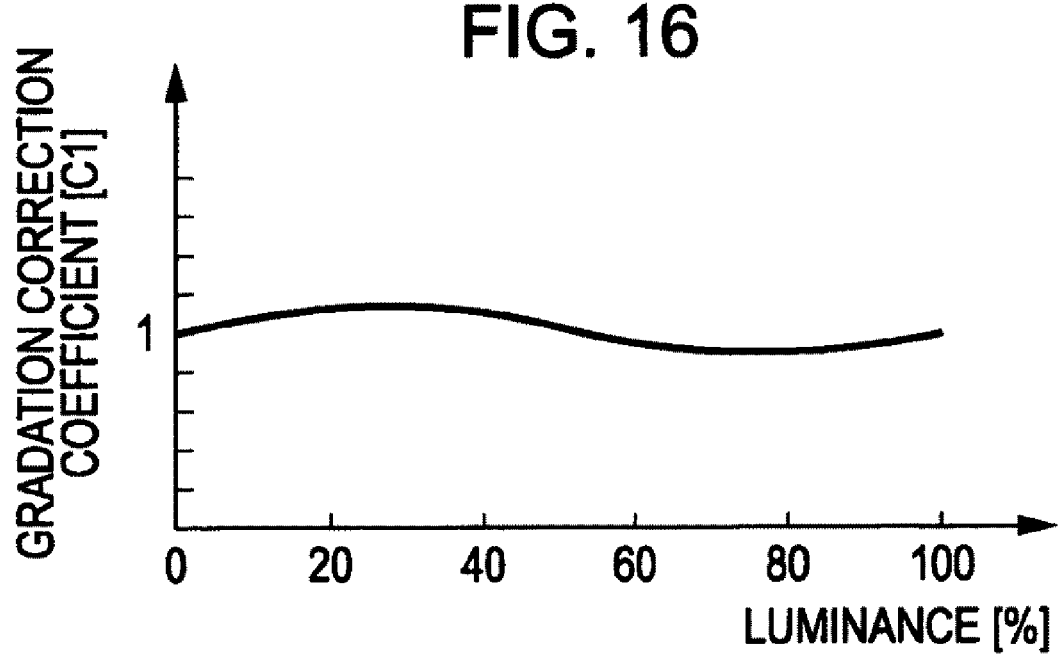
FIG. 16 is a characteristic curve diagram showing a specific example of a gradation correction coefficient.
Figure 17:
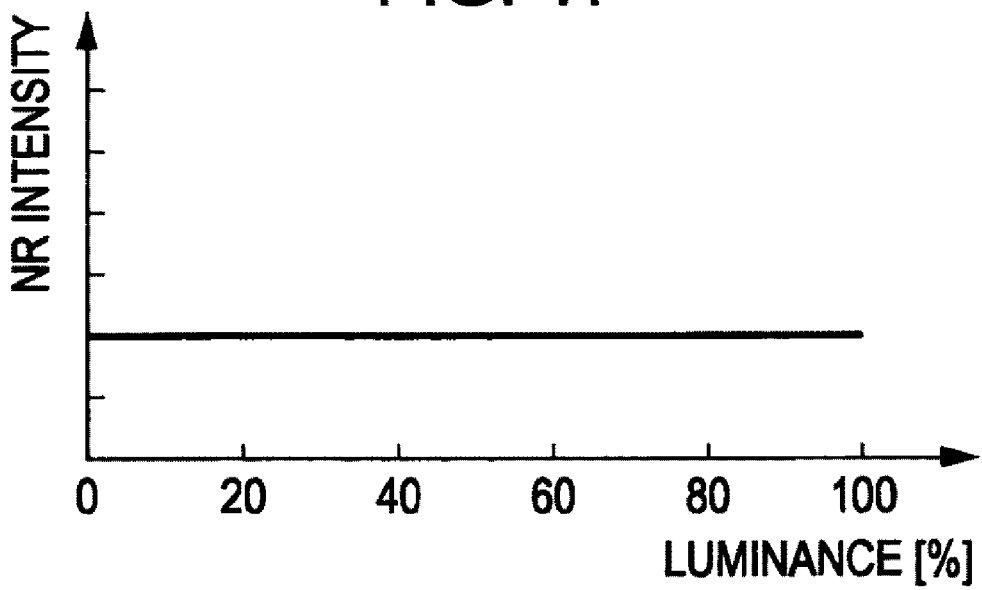
FIG. 17 is a characteristic curve diagram showing the amount of noise suppression of an SK process.
Figure 18:
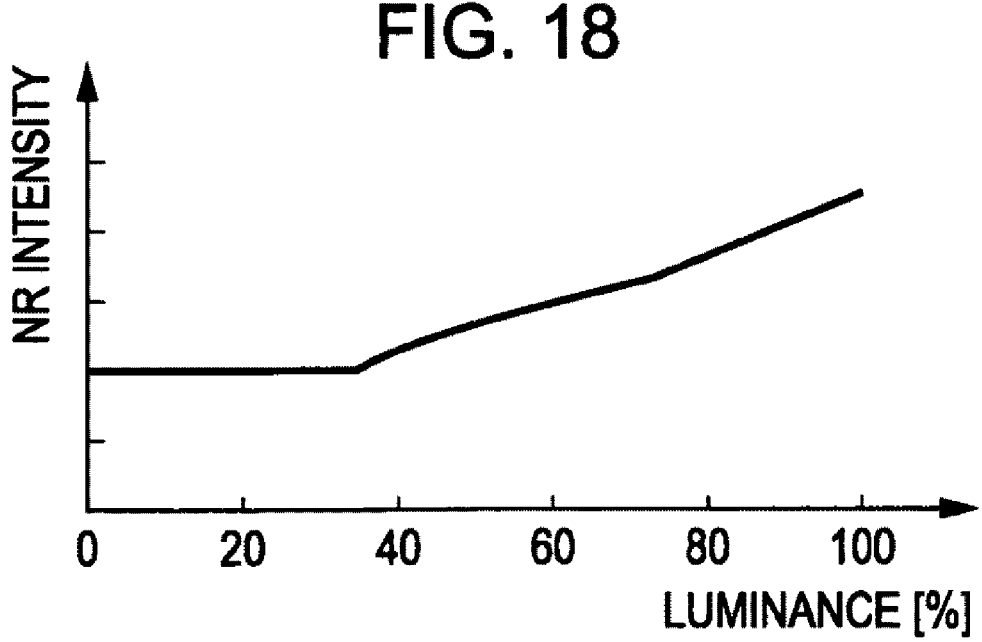
FIG. 18 is a characteristic curve diagram showing characteristics of a noise suppression process using characteristics of FIGS. 15 to 17.

FIG. 14, in contrast with FIG. 1, is a block diagram showing the configuration of the wide-dynamic-range correction unit 86, the gamma processor 9, and the skin-tone noise processor 38. The wide-dynamic-range correction unit 86 is provided with a correction unit 87 so that the correction unit 87 corrects the gradation correction value C1 in such a manner as to deal with correction of the gradation in the gamma processor 9 and outputs it. The gamma processor 9 generates a correction value corresponding to the luminance value of the image data D5 that is sequentially input on the basis of a gamma correction curve, and corrects the gamma characteristics by multiplying the correction value by the image data D5. The correction unit 87 sequentially multiplies the correction value in the gamma processor 9 by the gradation correction value C1, and outputs it. The present embodiment is configured the same as the above-described embodiments except that the configuration regarding the gamma processor 9 differs.

As in the present embodiment, gradation may be corrected by the wide-dynamic-range correction unit and the gamma processor.

Fourth Embodiment

In the above-described embodiments, a case has been described in which the present invention is applied to an electronic still camera and noise is suppressed using a noise model of equation (1). The present invention is not restricted to this, and can be widely applied to a case in which noise is suppressed using various kinds of noise models. That is, FIGS. 15 to 18, in contrast with FIGS. 6 to 9, are each a characteristic curve diagram showing characteristics in a case where noise is suppressed using a noise model represented by a primary function equation. As shown in FIGS. 15 to 18, also, when noise is to be suppressed in accordance with a noise model represented by a primary function equation, it is possible to obtain advantages similar to those of each of the above-described embodiments. Also, when noise is to be suppressed in accordance with various kinds of noise models other than a primary function, it is possible to obtain advantages similar to those of each of the above-described embodiments.

In the above-described embodiments, a case has been described in which a threshold value having a larger value is selected, and a parameter for suppressing noise and a parameter for correcting skin tone are combined. The present invention is not restricted to this. For example, for the method of combining parameters, for example, when these two parameters are to be weight-added, various computation processes can be applied as necessary.

In the above-described embodiments, a case has been described in which difference signals R-G and B-G of color signals are determined to detect pixels of skin tone. The present invention is not restricted to this, and various hue determination techniques can be widely applied to, for example, a case in which color-difference signals are determined to detect pixels of skin tone.

In the above-described embodiments, a case has been described in which a WDR process, or a WDR process and a gamma correction process, are performed before a noise suppression process. The present invention is not restricted to this, and can be widely applied to a case in which the gradation of image data is corrected by various non-linear type gradation correction processes and thereafter, a noise suppression process is performed, such as a case in which, for example, only a gamma correction process is performed before a noise suppression process.

In the above-described embodiments, a case has been described in which image data formed of color data of red, green, and blue is to be processed. The present invention is not restricted to this, and can be widely applied to a case in which image data formed of color data of the complementary color system of yellow, cyan, and magenta is to be processed, to a case in which image data formed of a luminance signal and color-difference signals is to be processed, or to other cases. In the above-described embodiments, a noise process for skin tone is performed. Alternatively, a noise process may be performed for other specific colors.

In the above-described embodiments, a case has been described in which the present invention is applied to an electronic still camera. The present invention is not restricted to this, and can be widely applied to various kinds of video devices, such as a video camera, a monitor device, and a recording and reproduction device.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a gradation correction unit configured to multiply input image data by a gradation correction value appropriate for the input image data so as to obtain gradation corrected image data; and
a noise suppression unit configured to suppress noise of the gradation corrected image data on the basis of a noise model of the input image data so as to obtain output image data,
wherein the noise suppression unit includes
a parameter generator configured to generate a noise suppression parameter in accordance with the gradation corrected image data by using the noise model;
a parameter correction unit configured to multiply the noise suppression parameter by the gradation correction value so as to correct the noise suppression parameter; and
a low-pass filter configured to vary characteristics thereof in accordance with the noise suppression parameter corrected by the parameter correction unit and to suppress noise of the gradation corrected image data.

2. The image processing apparatus according to claim 1, wherein the noise suppression unit comprises:
a specific color detector configured to determine hue of the gradation corrected image data and to detect pixels of a specific color;
a specific color correction parameter generator configured to, on the basis of a detection result of the specific color detector, generate a specific color correction parameter for varying the characteristics of the low-pass filter so that the amount of noise suppression is increased in the portion of the specific color of the input image data; and
a parameter combining unit configured to combine the noise suppression parameter corrected by the parameter correction unit and the specific color correction parameter in order to generate a parameter for varying the characteristics of the low-pass filter and to output the parameter for varying the characteristics to the low-pass filter.

3. The image processing apparatus according to claim 1, wherein the gradation correction unit measures a distribution of luminance values of the input image data, and generates the gradation correction value so that a luminance level difference between adjacent gradation values in a luminance level range in which the distribution is concentrated is increased.

4. The image processing apparatus according to claim 1, wherein the low-pass filter is an ε filter that varies a threshold value thereof in accordance with the noise suppression parameter corrected by the parameter correction unit.

5. The image processing apparatus according to claim 1, wherein the low-pass filter includes
first and second low-pass filters configured to receive the gradation corrected image data, the first and second low-pass filters having different characteristics; and a weighted addition unit configured to perform weighted addition of output data of the first and second low-pass filters by using weighting coefficients, wherein the weighting coefficients are varied in accordance with the noise suppression parameter corrected by the parameter correction unit in order to vary the characteristics.

6. An image processing method comprising the steps of:

obtaining gradation corrected image data by multiplying input image data by a gradation correction value appropriate for the input image data; and obtaining output image data by suppressing noise of the gradation corrected image data on the basis of a noise model of the input image data, wherein, in the step of obtaining the output image data, a noise suppression parameter is generated in accordance with the gradation corrected image data by using the noise model, the noise suppression parameter is multiplied by the gradation correction value in order to correct the noise suppression parameter, and noise of the gradation corrected image data is suppressed in accordance with characteristics varied in accordance with the corrected noise suppression parameter.

* * * * *